United States Patent
Chen et al.

(10) Patent No.: US 12,332,337 B2
(45) Date of Patent: Jun. 17, 2025

(54) RADAR VELOCITY MEASUREMENT SYSTEM AND METHOD AND RADAR DEVICE THEREOF

(71) Applicant: CUBTEK INC., Hsinchu County (TW)

(72) Inventors: Hong-Lun Chen, Hsinchu County (TW); Yu-Wang Hu, Hsinchu County (TW)

(73) Assignee: CUBTEK INC., Zhubei (TW)

( * ) Notice: Subject to any disclaimer, the term of this patent is extended or adjusted under 35 U.S.C. 154(b) by 457 days.

(21) Appl. No.: 17/722,790

(22) Filed: Apr. 18, 2022

(65) Prior Publication Data
US 2023/0086601 A1    Mar. 23, 2023

(30) Foreign Application Priority Data
Sep. 17, 2021    (TW) ................ 110134733

(51) Int. Cl.
*G01S 13/58*    (2006.01)
*G01S 13/32*    (2006.01)
*G01S 13/44*    (2006.01)

(52) U.S. Cl.
CPC ............ *G01S 13/589* (2013.01); *G01S 13/32* (2013.01); *G01S 13/4454* (2013.01)

(58) Field of Classification Search
CPC .... G01S 13/589; G01S 13/32; G01S 13/4454; G01S 13/343; G01S 13/583
See application file for complete search history.

(56) References Cited

U.S. PATENT DOCUMENTS

| | | | |
|---|---|---|---|
| 2020/0295816 A1* | 9/2020 | Kang | H04B 7/086 |
| 2020/0326422 A1* | 10/2020 | Sagi | G01S 13/9047 |
| 2021/0255303 A1* | 8/2021 | Laghezza | G01S 7/415 |

FOREIGN PATENT DOCUMENTS

| | | | |
|---|---|---|---|
| JP | 2017522574 | * | 8/2017 |
| WO | WO2021090611 | * | 5/2021 |

* cited by examiner

*Primary Examiner* — Whitney Moore
(74) *Attorney, Agent, or Firm* — Birch, Stewart, Kolasch & Birch, LLP (57) ABSTRACT

The present invention provides a radar velocity measurement system, method, and radar device. The system includes a radar module and an electrically connected signal processor. The radar module includes a transmission antenna and a receive antenna. The signal processor includes a sequence unit, a conversion unit, and a compare calculation unit that are coupled with each other. The sequence unit establishes an even number receive sequence and an odd number receive sequence. The conversion unit carries out a time domain to frequency domain conversion upon the receive sequences to generate a first reflection signal and a second reflection signal, respectively. The compare calculation unit uses an interpolation method to compare the phase difference between the reflection signals with a comparison model to obtain a true velocity. Therefore, the present invention effectively prevents the velocity ambiguity issue of radar system.

20 Claims, 7 Drawing Sheets

RADAR VELOCITY MEASUREMENT SYSTEM AND METHOD AND RADAR DEVICE THEREOF

BACKGROUND OF THE INVENTION

1. Field of the Invention

The present invention relates to radar systems, and more particularly, to a radar velocity measurement system.

2. Description of the Related Art

Radar systems are generally divided into pulsed radars and continuous-wave radars according to the transmission waveform. Therein, continuous-wave radars are the earliest widely used radars in radar systems. Early continuous-wave radars detect an object within the detection range according to existing radar echo and obtain the location of the object. However, while the above-mentioned continuous-wave radars only transmits electromagnetic waves of a fixed frequency, such radars only detect the existence of the object, but the distance and relative velocity of the object cannot be acquired.

Therefore, the frequency modulated continuous waveform radar (FMCW Radar) is developed. In the application of the FMCW Radar, vehicle radar is one of the main applications. FMCW Radar applies the frequency modulation method to transmit a set of electromagnetic waves whose frequency changes with time, and calculates the relative velocity between the vehicle body and the object through the frequency difference between the transmitted electromagnetic wave and the radar echo.

However, due to the limitation of the sampling frequency range of the receiving frequency of the FMCW Radar, if the radar echo reflected by the object is lower or higher than the sampling frequency range of the FMCW Radar antenna, or it is operating at a repetition frequency, an overlapping frequency spectrum occurs, causing a confusion of the measured velocity of the object, such that the truth velocity of the target object can be difficult to be determined, resulting in a velocity ambiguity issue.

SUMMARY OF THE INVENTION

The present invention discloses a radar velocity measurement system and method for resolving the issue of radar velocity ambiguity.

For achieving the aforementioned objectives, a radar velocity measurement system is provided, comprising a radar module and a signal processor, the radar module comprising a transmission antenna and a receive antenna, the transmission antenna transmitting an electromagnetic wave signal, the electromagnetic wave signal being orderly formed of a first sub-signal and a second sub-signal; a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time; the receive antenna receiving an echo signal of the electromagnetic wave signal reflected by a target object; the signal processor being electrically connected with the radar module, the signal processor comprising a sequence unit, a conversion unit, and a compare calculation unit that are coupled with each other; the sequence unit establishing an even number receive sequence with a plurality of the first sub-signals, and establishing an odd number receive sequence with a plurality of the second sub-signals according to the echo signal; the conversion unit carrying out a time domain to frequency domain conversion upon the even number receive sequence and the odd number receive sequence, so as to generate a first reflection signal and a second reflection signal, respectively; the compare calculation unit comprising a comparison model, the compare calculation unit using the comparison model to carry out a comparison with a phase difference between the first reflection signal and the second reflection signal, thereby obtaining a true reflection frequency.

Another embodiment of the present invention provides a radar velocity measurement method, comprising following steps: step S1, transmitting an electromagnetic wave signal through a transmission antenna, the electromagnetic wave signal being formed of a first sub-signal and a second sub-signal, a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time; step S2: receiving an echo signal of the electromagnetic wave signal reflected by a target object with a receive antenna, processing the echo signal with a signal processor to generate an even number receive sequence formed of a plurality of first sub-signals and an odd number receive sequence formed of a plurality of second sub-signals; step S3: carrying out a time domain to frequency domain conversion upon the even number receive sequence and the odd number receive sequence, respectively, so as to obtain a first reflection signal and a second reflection signal; both a frequency of the first reflection signal and a frequency of the second reflection signal being a reflection frequency, a phase of the first reflection signal being different from a phase of the second reflection signal; and step S4: obtaining a phase difference between the first reflection signal and the second reflection signal, and carrying out a comparison upon the reflection frequency, thereby obtaining a true reflection frequency and calculating a true velocity according to the true reflection frequency.

Another embodiment of the present invention provides a radar device, comprising a transmission antenna and a receive antenna, the transmission antenna transmitting an electromagnetic wave signal which is orderly formed of a first sub-signal and a second sub-signal, a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time; wherein, a ratio of the first transmission time divided by the transmission cycle ranges from 0.2 to 0.8; the receive antenna receiving an echo signal of the electromagnetic wave signal reflected by a target object.

With such configuration, the radar module of the present invention transmits the electromagnetic wave signal orderly formed of the first sub-signal and the second sub-signal, and the signal processor establishes the even number receive sequence and the odd number receive sequence according to the echo signal reflected by the target object, so as to obtain the first reflection signal and the second reflection signal after a respective time domain to frequency domain conversion. Then, the phase different between the reflection signals

DETAILED DESCRIPTION OF THE INVENTION

The aforementioned and further advantages and features of the present invention will be understood by reference to the description of the preferred embodiment in conjunction with the accompanying drawings where the components are illustrated based on a proportion, size, deformation or displacement for explanation but not subject to the actual component proportion.

Figure 1:
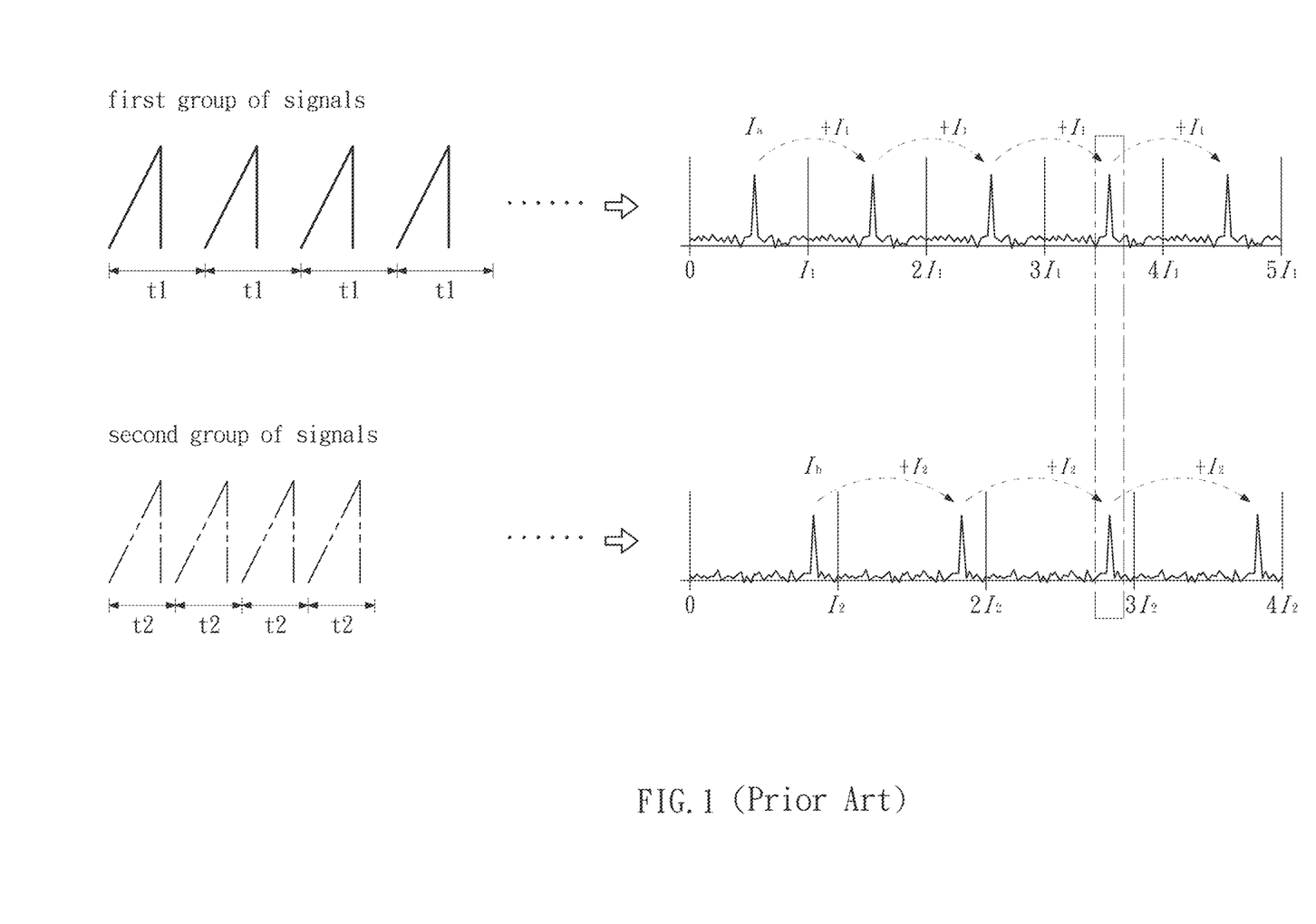
FIG. 1 is a schematic diagram illustrating the method of using Chinese Remainder Theorem (CRT) to prevent velocity ambiguity.

Referring to FIG. 1, the Chinese Remainder Theorem (CRT) is a method of resolving the velocity ambiguity issue. In this method, the transmission antenna transmits two sets of signal, respectively, so that the first set of signal is transmitted first, and the second set of signal is subsequently transmitted. Therein, the first set of signal is formed of a plurality of sub-signals whose transmission cycle is defined as t1, and the second set of signal is formed of a plurality of sub-signals whose transmission cycle is defined as t2, wherein the transmission cycle t1 is different from the transmission cycle t2, and the resolution ranges of the velocity of the two sets of signals are also different.

When the two sets of signals above are reflected by a target object, the receive antenna receives two sets of reflection signals, respectively, and then carries out a frequency domain analysis upon the two sets of reflection signals, so as to obtain a frequency domain signal converted from the first set of signals and another frequency domain signal converted from the second set of signals. The resolvable Doppler frequency range of the first set of signals is I1, and the resolved frequency is shown as Ia. However, due to the limitation of the Doppler frequency range, the actual frequency of the first set of signals may be Ia+nI1, wherein the n is an integer larger than or equal to 0. The resolvable Doppler frequency range of the second set of signals is I2, and the resolved frequency is shown as Ib, but the actual frequency of the second set of signals is possibly Ib+mI2, wherein the m is an integer larger than or equal to 0. The frequency range I1 and frequency range I2 respectively correspond to the transmission cycle of the first set of signals and the second set of signals. Therein, the number of chirps of the two sets of signals are identical, so that the number of the resolved Doppler bins are identical. However, the cycles of the two sets of transmission signals are different, so that the resolvable frequency range I1 and the frequency range I2 are also different. Therefore, after the frequency domain analysis process, the frequency Ia is different from the frequency 1b.

Based on the fact that the two sets of signals are the reflection of the same target object, the frequency of the first set of signals will actually be identical to the frequency of the second set of signals. In other words, the frequency Ia+nI1 equals to the frequency Ib+mI2. To obtain the correct velocity of the target object with respect to the antenna, the true frequency has to be obtained by calculating the common multiple of the solution of the two sets of signals.

For example, when the resolvable frequency range I1 of the first set of signals is 40, and the resolved frequency Ia thereof is 20, and the resolvable frequency range I2 of the second set of signals is 30, and the resolved frequency Ib thereof is 10, values of the I1, I2, Ia, and Ib are introduced into the formula of Ia+nI1=Ib+mI2, so as to obtain that 20+n40=10+m30. In other words, when n is 2 and m is 3, the true frequency of the first set of signals and the second set of signals are both 100. By obtaining the true frequency, the correct velocity of the target object with respect to the antenna is obtained.

However, because this method of solution finds the true velocity by matching the two sets of signals, when the environmental conditions are not ideal or the signal-to-noise ratio is unstable, the signals are easily lost, and the matching calculation is unable to be carried out. Besides, because multiple loop matching calculations are required according to the multiple of its expansion based on the resolvable Doppler frequency range and the resolved frequency of the two sets of signals, huge calculation resources are needed. Further, the second set of signals can are transmitted after the first set of signals are transmitted, which is relatively time consuming.

Figure 2:
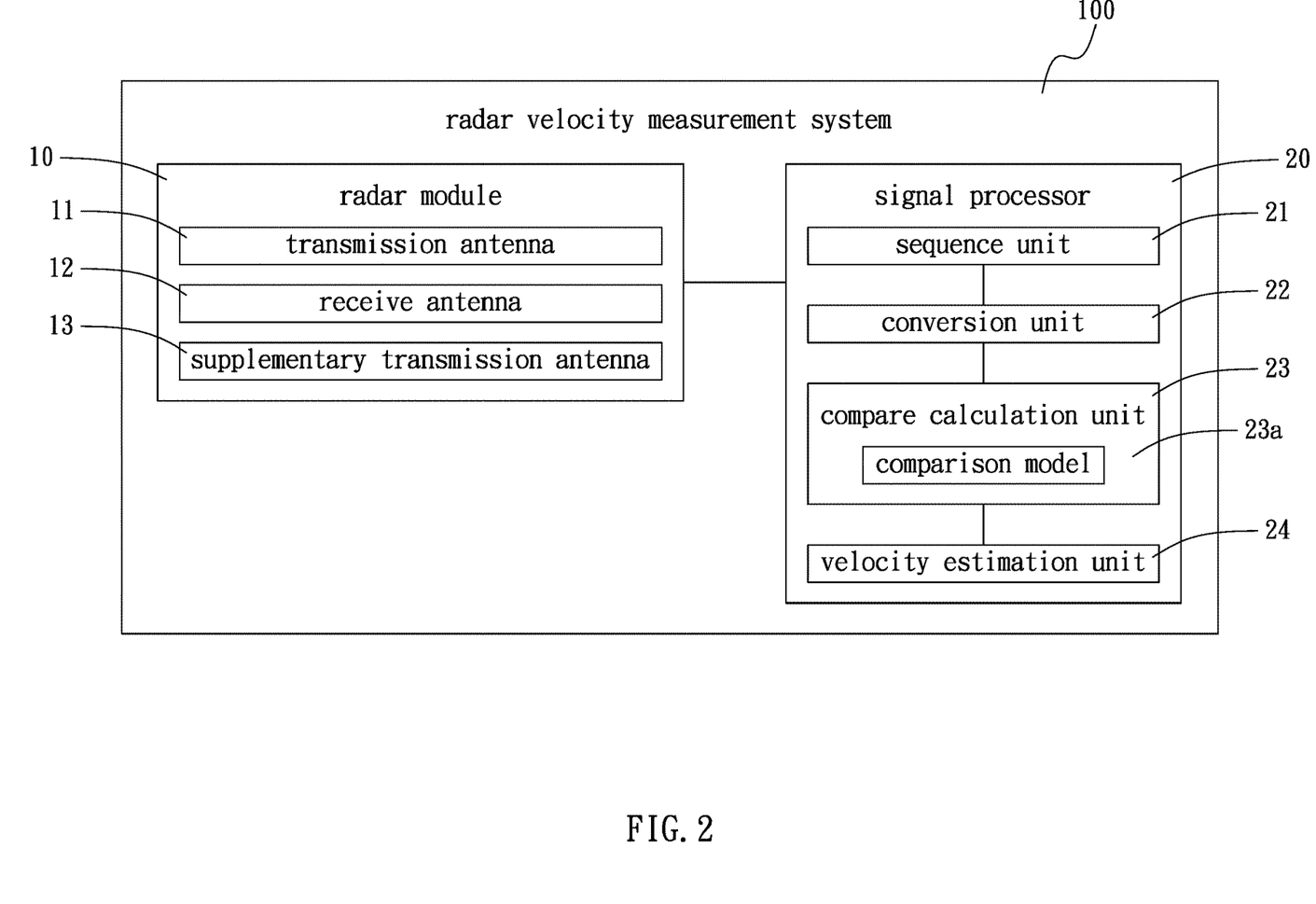
FIG. 2 is a structural block diagram of the system in accordance with the present invention.

Referring to FIG. 2 to FIG. 7, the present invention provides a radar velocity measurement system 100 avoiding velocity ambiguity. FIG. 2 is a structural block diagram of the system in accordance with the present invention. The radar velocity measurement system 100 of the present invention comprises a radar module 10 and a signal processor 20 electrically connected thereto.

Figure 3:
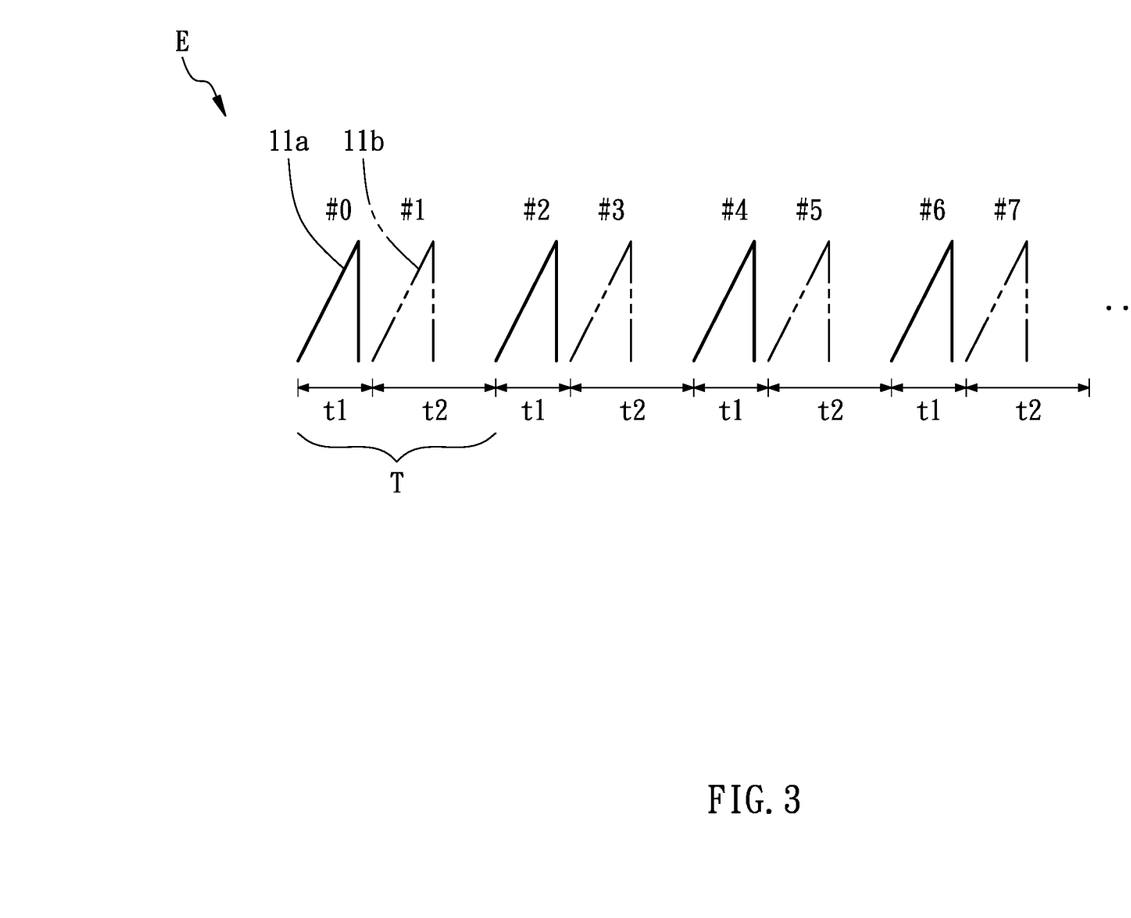
FIG. 3 is a schematic view of the electromagnetic wave signal in accordance with an embodiment of the present invention.

The radar module 10 comprises a transmission antenna 11 and a receive antenna 12. The transmission antenna 11 transmits an electromagnetic wave signal E in a single frame, and the receive antenna 12 receives an echo signal R of the electromagnetic wave signal E reflected by a target object. Referring to FIG. 3, the electromagnetic wave signal E is orderly formed of a first sub-signal 11a and a second sub-signal 11b. The time of transmitting a single first sub-signal 11a and a single second sub-signal 11b are defined as a transmission cycle T, and the transmission cycle T is orderly formed of a first transmission time t1 of the first sub-signal 11a and a second transmission time t2 of the second sub-signal 11b. Also, the first transmission time t1 is different from the second transmission time t2.

In the embodiment, the electromagnetic signal E transmitted from transmission antenna 11 is a frequency modulated continuous wave (FMCW), wherein the first sub-signal 11a and the second sub-signal 11b are both a triangular wave, so that the electromagnetic wave E is presented as a sawtooth wave.

The signal processor 20 comprises a mutual coupling of sequence unit 21, a conversion unit 22, a compare calculation unit 23, and a velocity estimation unit 24.

Figure 4:
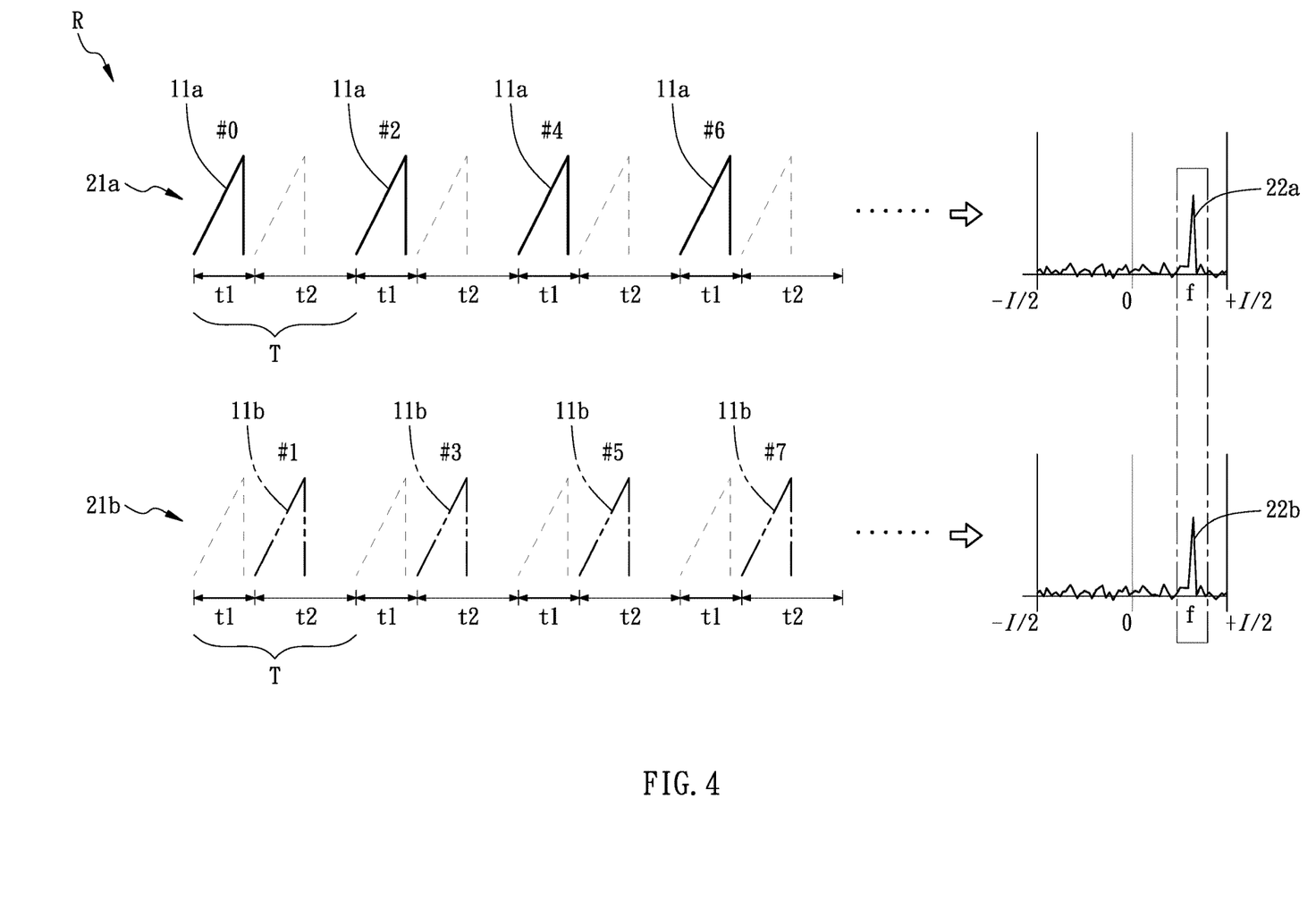
FIG. 4 is a schematic view illustrating the operation of preventing velocity ambiguity in accordance with an embodiment of the present invention.

Referring to FIG. 4, the sequence unit 21 establishes an even number receive sequence 21a (sequence #0, #2 . . . ) with a plurality of the first sub-signals 11a, and establishes an odd number receive sequence 21b (sequence #1, #3 . . . ) with a plurality of the second sub-signals 11b, according to the echo signal R.

The conversion unit 22 carries out the frequency spectrum analysis and performs a time domain to frequency domain conversion upon the even number receive sequence 21a and the odd number receive sequence 21b, so as to generate a first reflection signal 22a and a second reflection signal 22b, respectively in both spectrums. Therein, the transverse axis I in the frequency spectrum represents the frequency: $I=2\pi$. Because the velocity of the target object is identical, the frequency of the first reflection signal 22a and the second reflection signal 22b are both the reflection frequency f. However, due to the transmission time difference of the first sub-signal 11a and the second sub-signal 11b in the transmission cycle T, after the frequency domain conversion, phases of the first reflection signal 22a and the second reflection signal 22b are also different. In the embodiment, the time domain to frequency domain conversion is a Fourier Transform or a Fast Fourier Transform of the even number receive sequence 21a and the odd number receive sequence 21b.

The compare calculation unit 23 comprises a comparison model 23a. The compare calculation unit 23 first obtains a phase difference between the first reflection signal 22a and the second reflection signal 22b. The compare calculation unit 23 uses an interpolation method to carry out a comparison calculation upon the phase difference and the comparison model 23a, thereby obtaining a true reflection frequency. Therein, the phase difference is proportional to the value of the first transmission time t1 being divided by the transmission cycle T; also, when the transmission cycle T is larger, the system requires a higher phase accuracy. Preferably, the ratio of the first transmission time t1 divided by the transmission cycle T ranges from 0.2 to 0.8. Most preferably, the ratio of the first transmission time t1 divided by the transmission cycle T ranges from 0.4 to 0.6.

In the embodiment, the comparison model 23a is allowed to be: $(f+2\ k\pi)*(t1/(t1+t2))$. Therein, f represents the reflection frequency, whose value ranges from 0 to $2\pi$; t1 represents the first transmission time; t2 represents the second transmission time; and k is an integer. When the value of k is adjusted for the value of the comparison model 23a to be equal to the phase difference, the true reflection frequency is $f+2\ k\pi$.

According to the value of the true reflection frequency obtained by the compare calculation unit 23, the velocity estimation unit 24 calculates the true velocity of the target object with respect to the radar module 10, such that velocity ambiguity is effectively resolved through the single electromagnetic wave signal E transmitted by the single transmission antenna 11 in the single frame. From the description above, the true velocity is able to be obtained in one transmission cycle T, so that such method has lower calculation complexity and faster analysis time than the Chinese Remainder Theorem (CRT).

Figure 5:
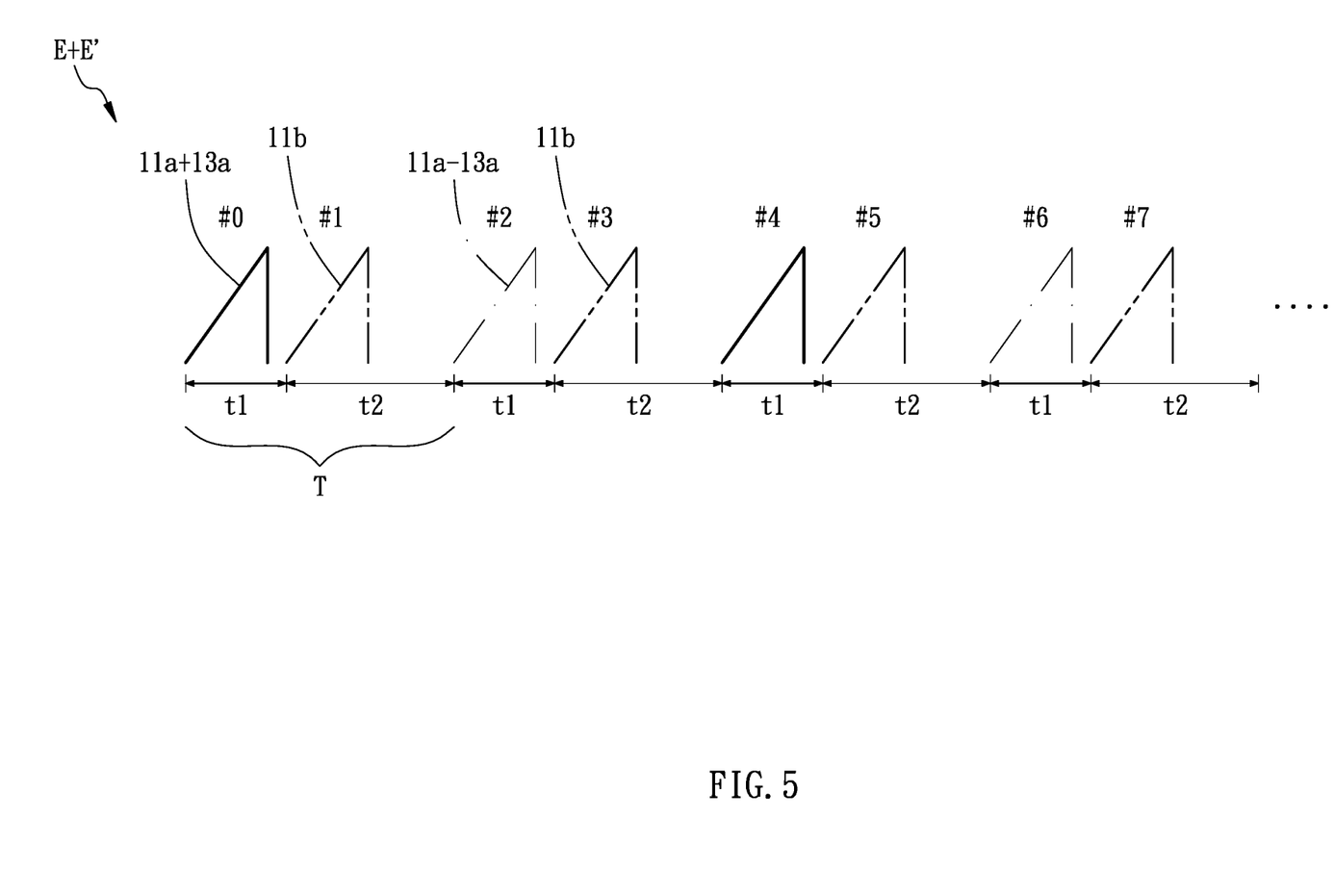
FIG. 5 is a schematic view of the electromagnetic wave signal and supplementary electromagnetic wave signal of the present invention applied to a MIMO system.

To effectively improve the frequency spectrum efficiency of the antenna system and improve the communication quality, the system usually applies a plurality of antennas, such as a Multi-input Multi-output (MIMO) system. In another embodiment of the present invention, when applied to a MIMO system, after the conversion of the echo signal R by the conversion unit 22, the electromagnetic wave signals E of different transmitting antennas 11 might all be presented as the reflection frequency f on the spectrum, causing the received signals to overlap on the power frequency spectrum, such that the signals are difficult to be separated. As a result, it is impossible to identify the transmitting antenna 11 from which the reflection frequency f originates, and the issue of signal ambiguity occurs. For preventing such technical difficulty, the present invention further provides the following processing method. Therein, the radar module 10 of the present invention further comprises a supplementary transmission antenna 13, which transmits a supplementary electromagnetic wave signal E', such that the receive antenna 12 receives the echo signal R of the electromagnetic wave signal E and the supplementary electromagnetic wave signal E' reflected by the target object.

For further explanation, referring to FIG. 5, in the embodiment, the transmission antenna 11 and the supplementary transmission antenna 13 transmits the electromagnetic wave signal E and the supplementary electromagnetic wave signal E' in a same frame respectively. The transmission cycle T of the supplementary electromagnetic wave signal E' is identical to that of the electromagnetic wave signal E. The supplementary electromagnetic signal E' comprises a first supplementary sub-signal 13a, and the first supplementary sub-signal 13a is transmitted at the first transmission time t1 simultaneously with the first sub-signal 11a, wherein the first supplementary sub-signal 13a has different phases in the two neighboring transmission cycles T. In the embodiment, the first supplementary sub-signal 13a has opposite phases in the two neighboring transmission cycles T, which means that the phase thereof changes by 180 degrees. In other words, at sequence #0, the signal is 11a+13a. At sequence #2, because the first supplementary sub-signal 13a changes into an opposite phase signal, the actual signal presented in the opposite phase signal is 11a-13a. Then, at sequence #4, the signal again changes into 11a+13a, so on and so forth.

Figure 6:
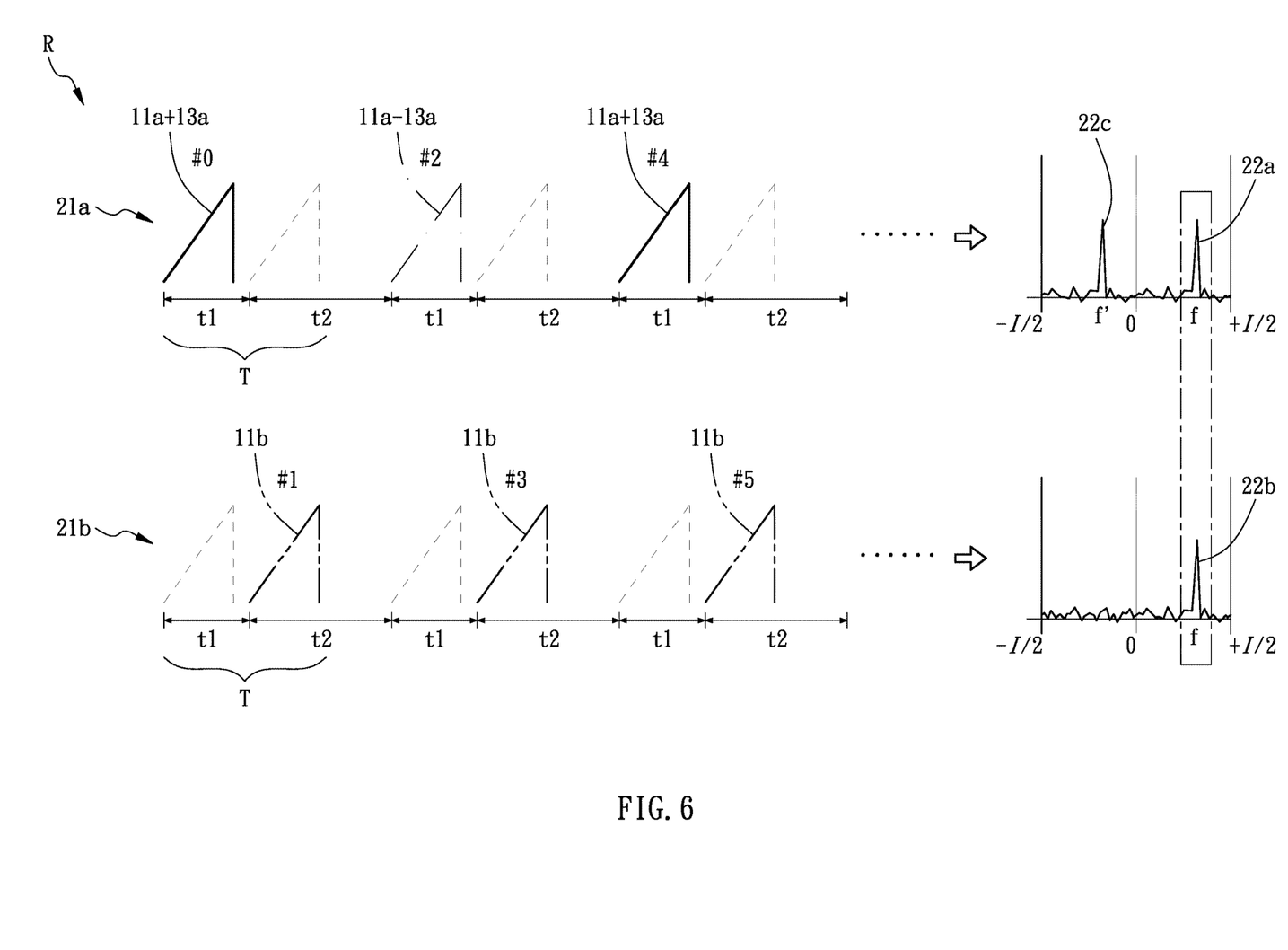
FIG. 6 is a schematic view illustrating the operation of preventing signal ambiguity of the present invention applied to a MIMO system.

For further description, when applied to a MIMO system, referring to FIG. 6, after the signal is reflected, the sequence unit 21 establishes an even number receive sequence 21a with a plurality of the first sub-signals 11a and a plurality of the first supplementary sub-signals 13a, and establishes an odd number receive sequence 21b with a plurality of the second sub-signals 11b, according to the echo signal R.

The conversion unit 22 carries out the frequency spectrum analysis and performs a time domain to frequency domain conversion upon the even number receive sequence 21a and the odd number receive sequence 21b, so as to generate a first reflection signal 22a and a supplementary reflection signal 22c converted from the even number receive sequence 21a in first frequency spectrum and a second reflection signal 22b converted from the odd number receive sequence 21b in another frequency spectrum, respectively.

Therein, as mentioned above, the frequencies of the first reflection signal 22a and the second reflection signal 22b are both reflection frequency f, while the frequency of the supplementary reflection signal 22c is a supplementary reflection frequency f', based on the fact that the first supplementary sub-signal 13a has a phase variation in the two neighboring transmission cycles T, such that the supplementary reflection frequency f' of the first supplementary sub-signal 13a is different from the reflection frequency f, so as to be separated from the power frequency spectrum. Therefore, by observing the signals having the different frequency in the frequency spectrum, the transmission antenna 11 and the supplementary transmission antenna 13 can be distinguished, thereby preventing the signal ambiguity, and analyzing the true velocity in the frame.

Figure 7:
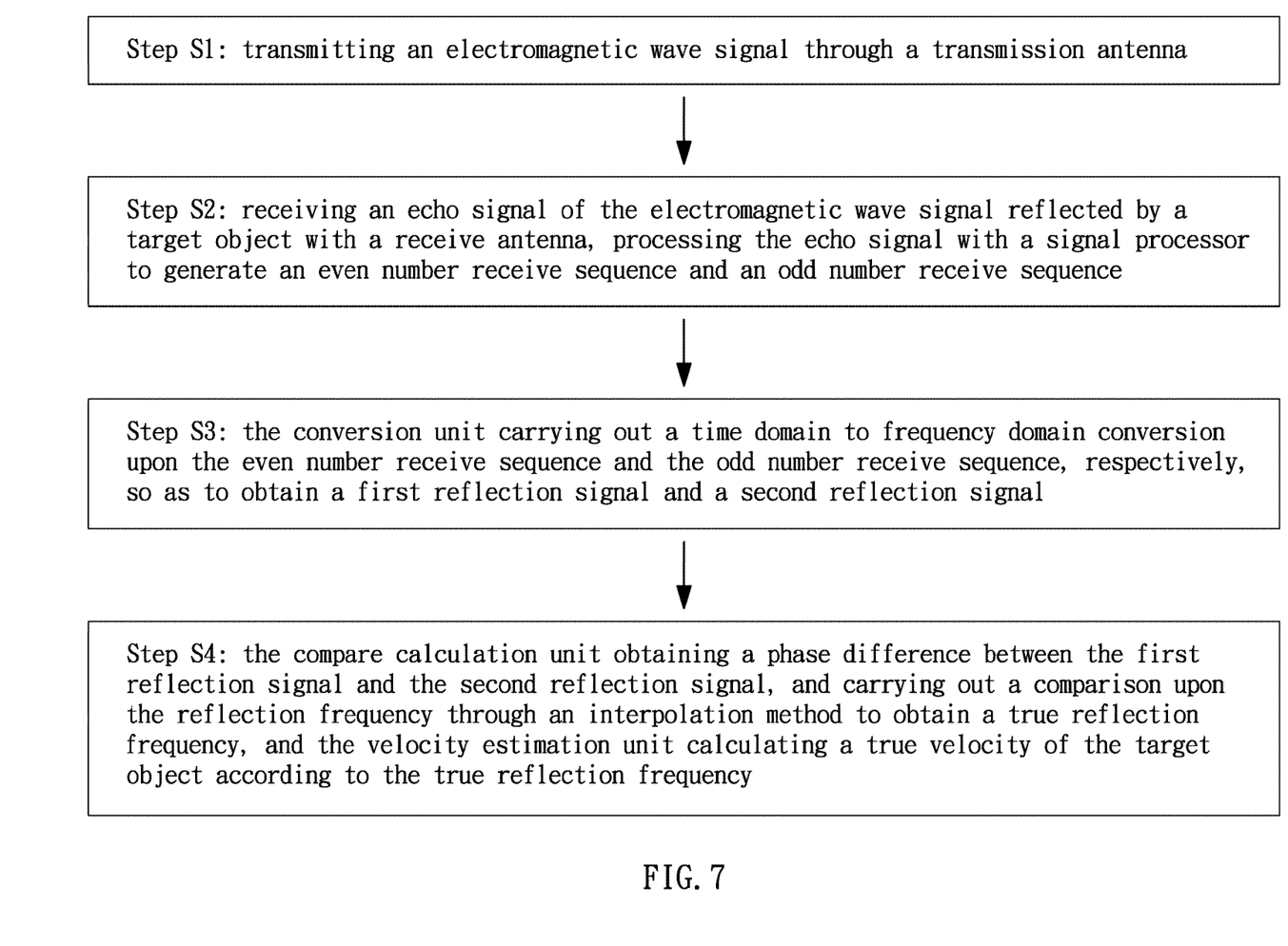
FIG. 7 is a flow chart of the method in accordance with the present invention.

Referring to FIG. 7, which is a flow chart of the method of the present invention, the present invention further provides a radar velocity measurement method, comprising following steps.

Step S1: transmitting an electromagnetic wave signal E through a transmission antenna 11 of the radar module 10. The electromagnetic wave signal E is formed of a first sub-signal 11a and a second sub-signal 11b. The time of transmitting a single first sub-signal 11a and a single second sub-signal 11b are defined as a transmission cycle T, wherein the transmission cycle T is orderly formed of a first transmission time t1 of the first sub-signal 11a and a second transmission time t2 of the second sub-signal 11b. Also, the first transmission time t1 is different from the second transmission time t2. Therein, the ratio of the first transmission time t1 divided by the transmission cycle T ranges from 0.2 to 0.8.

step S2: receiving an echo signal R of the electromagnetic wave signal E reflected by a target object with a receive antenna 12 of the radar module 10, and processing the echo signal R with the sequence unit 21 of the signal processor 20, so as to generate an even number receive sequence 21a formed of a plurality of the first sub-signals 11a and an odd number receive sequence 21b formed of a plurality of the second sub-signals 11b.

step S3: carrying out a time domain to frequency domain conversion upon the even number receive sequence 21a and the odd number receive sequence 21b, respectively, with the conversion unit 22, so as to obtain a first reflection signal 22a and a second reflection signal 22b in two frequency spectrums, respectively. Because the first reflection signal 22a and the second reflection signal 22b are from the identical target object, both a frequency of the first reflection signal 22a and a frequency of the second reflection signal 22b are a reflection frequency f, but the phase of the first reflection signal 22a is different from the phase of the second reflection signal 22b.

Step S4: obtaining a phase difference between the first reflection signal 22a and the second reflection signal 22b with a compare calculation unit 23, and carrying out the interpolation method comparison with the reflection frequency f, thereby obtaining the true reflection frequency.

In the embodiment, in step S4, the interpolation method comparison is carried out upon the phase difference between the first reflection signal 22a and the second reflection signal 22b and the comparison model 23a stored in the compare calculation unit 23. Then, the true velocity of the target object with respect to the radar module 10 is calculated and obtained through the true reflection frequency by the velocity estimation unit 24.

When applied to the MIMO system, referring to FIG. 1, a supplementary transmission antenna 13 is further comprised. The supplementary transmission antenna 13 transmits the supplementary electromagnetic wave signal E'. The transmission cycle T of the supplementary electromagnetic wave signal E' is identical to that of the electromagnetic wave signal E, and the supplementary electromagnetic wave signal E' comprises a first supplementary sub-signal 13a. The first supplementary sub-signal 13a is transmitted at the first transmission time t1 simultaneously with the first sub-signal 11a, wherein the first supplementary sub-signal 13a has different phases in the two neighboring transmission cycles T.

For further explanation, when applied to the MIMO system, in step S2, the receive antenna 12 of the radar module 10 receives the echo signal R of the electromagnetic wave signal E and the supplementary electromagnetic wave signal E' reflected by a target object, and the sequence unit 21 of the signal processor 20 processes the echo signal R, so as to generate an even number receive sequence 21a formed of a plurality of the first sub-signals 11a and a plurality of the first supplementary sub-signals 13a and an odd number receive sequence 21b formed of a plurality of the second sub-signals 11b.

Next in step S3, the conversion unit 22 carries out a time domain to frequency domain conversion upon the even number receive sequence 21a and the odd number receive sequence 21b, respectively, so as to generate the first reflection signal 22a and the supplementary reflection signal 22c converted from the even number receive sequence 21a in the first frequency spectrum, and generate a second reflection signal 22b converted from the odd number receive sequence 21b in another frequency spectrum, respectively. Therein, the frequency of the supplementary reflection signal 22c is a supplementary reflection frequency f', and the frequency of the first reflection signal 22a and the frequency of the second reflection signal 22b are both the reflection frequency f, wherein the supplementary reflection frequency f' is different from the reflection frequency f.

By observing the signals having different frequencies in the frequency spectrum, the transmission antenna 11 and the supplementary transmission antenna 13 are distinguished, thereby preventing the antenna signal ambiguity from occurring and moving on to the subsequent step S4.

With the foregoing configuration, functions and effects of the present invention will be illustrated below.

The radar module 10 transmits the electromagnetic wave signal E orderly formed of the first sub-signal 11a and the second sub-signal 11b in a single frame, and the signal processor 20 establishes the even number receive sequence 21a and the odd number receive sequence 21b according to the echo signal R reflected by the target object. The conversion unit 22 obtains the first reflection signal 22a and the second reflection signal 22b after the conversion, respectively. When the compare calculation unit 23 carries out the comparison with Doppler frequency, the actual velocities overlap, and the true velocity of the target object with respect to the radar module 10 is obtained, thereby preventing the velocity ambiguity issue.

The present invention effectively solves the velocity ambiguity through the single electromagnetic wave signal E transmitted by the single transmission antenna 11. Besides, the true velocity is resolved in a single frame, so that the calculation loading is significantly lowering, and the resolution process is accelerated.

Further, when the present invention is applied to MIMO system, the radar module 10 transmits a supplementary electromagnetic wave signal E' whose transmission cycle T is identical to that of the electromagnetic wave signal E. The first supplementary sub-signal 13a of the supplementary electromagnetic wave signal E' has different phases in the two neighboring transmission cycles T. The signal processor 20, after processing the echo signal R reflected by the target object, distinguishes the transmission antenna 11 and the supplementary transmission antenna 13, which are separated in the power frequency spectrum, thereby preventing the signal ambiguity and resolving the true velocity in a single frame.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A radar velocity measurement system, comprising:
a radar module comprising a transmission antenna and a receive antenna, the transmission antenna transmitting an electromagnetic wave signal, the electromagnetic wave signal being orderly formed of a first sub-signal and a second sub-signal; a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time; the receive antenna receiving an echo signal of the electromagnetic wave signal reflected by a target object, wherein the radar module comprises a supplementary transmission antenna, which transmits a supplementary electromagnetic wave signal whose transmission cycle is identical to the transmission cycle of the electromagnetic signal; the supplementary electromagnetic signal comprises a first supplementary sub-signal, and the first supplementary sub-signal is transmitted at the first transmission time simultaneously with the first sub-signal, wherein the first supplementary sub-signal has different phases in two neighboring transmission cycles; and
a signal processor electrically connected with the radar module, the signal processor comprising a sequence unit, a conversion unit, and a compare calculation unit that are coupled with each other; the sequence unit establishing an even number receive sequence with a plurality of the first sub-signals, and establishing an odd number receive sequence with a plurality of the second sub-signals according to the echo signal; the conversion unit carrying out a time domain to frequency domain conversion upon the even number receive sequence and the odd number receive sequence, so as to generate a first reflection signal and a second reflection signal, respectively; the compare calculation unit comprising a comparison model, the compare calculation unit using the comparison model to carry out a comparison with a phase difference between the first reflection signal and the second reflection signal, thereby obtaining a true reflection frequency.

2. The radar velocity measurement system of claim 1, wherein the electromagnetic signal is a frequency modulated continuous wave (FMCW).

3. The radar velocity measurement system of claim 2, wherein the first sub-signal and the second sub-signal are both a triangular wave, such that the electromagnetic wave signal is presented as a sawtooth wave.

4. The radar velocity measurement system of claim 1, wherein the time domain to frequency domain conversion of the even number receive sequence and the odd number receive sequence is a Fourier Transform or a Fast Fourier Transform of the even number receive sequence and the odd number receive sequence.

5. The radar velocity measurement system of claim 1, wherein the comparison model is $(f+2\ k\pi)*(t1/(t1+t2))$; $f$ represents the reflection frequency, whose value ranges from 0 to $2\pi$; $t1$ represents the first transmission time; $t2$ represents the second transmission time; and $k$ is an integer; when the value of $k$ is adjusted for a value of the comparison model to be equal to the phase difference, the true reflection frequency is $f+2\ k\pi$.

6. The radar velocity measurement system of claim 1, wherein the compare calculation unit compares the phase difference and the comparison model through an interpolation method.

7. The radar velocity measurement system of claim 1, wherein a ratio of the first transmission time divided by the transmission cycle ranges from 0.2 to 0.8.

8. The radar velocity measurement system of claim 1, wherein the signal processor comprises a velocity estimation unit, which calculates a true velocity of the target object with respect to the radar module according to the true reflection frequency.

9. The radar velocity measurement system of claim 1, wherein the even number receive sequence established by the sequence unit is formed of a plurality of first sub-signals and a plurality of first supplementary sub-signals.

10. The radar velocity measurement system of claim 9, wherein after the conversion unit carries out the time domain to frequency domain conversion upon the even number receive sequence, a supplementary reflection signal is further obtained; a frequency of the supplementary reflection signal is a supplementary reflection frequency which is different from the reflection frequency.

11. A radar velocity measurement method, comprising the following steps:
step S1: transmitting an electromagnetic wave signal through a transmission antenna, the electromagnetic wave signal being formed of a first sub-signal and a second sub-signal, a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time;
step S2: receiving an echo signal of the electromagnetic wave signal reflected by a target object with a receive antenna, processing the echo signal with a signal processor to generate an even number receive sequence formed of a plurality of first sub-signals and an odd number receive sequence formed of a plurality of second sub-signals;
step S3: carrying out a time domain to frequency domain conversion upon the even number receive sequence and the odd number receive sequence, respectively, so as to obtain a first reflection signal and a second reflection signal, respectively; a frequency of the first reflection signal and a frequency of the second reflection signal being a reflection frequency, but a phase of the first reflection signal being different from a phase of the second reflection signal; and
step S4: obtaining a phase difference between the first reflection signal and the second reflection signal, and carrying out a comparison upon the reflection frequency, thereby obtaining a true reflection frequency and calculating a true velocity according to the true reflection frequency,
wherein, in step S1, a supplementary transmission antenna is further comprised, the supplementary transmission antenna transmits a supplementary electromagnetic wave signal whose transmission cycle is identical to the transmission cycle of the electromagnetic signal; the supplementary electromagnetic signal comprises a first supplementary sub-signal, and the first supplementary sub-signal is transmitted at the first transmission time simultaneously with the first sub-signal, wherein the first supplementary sub-signal has different phases in two neighboring transmission cycles.

12. The radar velocity measurement method of claim 11, wherein the electromagnetic signal is a frequency modulated continuous wave (FMCW).

13. The radar velocity measurement method of claim 12, wherein, in step S1, the first sub-signal and the second sub-signal are both a triangular wave, such that the electromagnetic wave signal is presented as a sawtooth wave.

14. The radar velocity measurement method of claim 11, wherein, in step S3, the time domain to frequency domain conversion of the even number receive sequence and the odd number receive sequence is a Fourier Transform or a Fast Fourier Transform of the even number receive sequence and the odd number receive sequence.

15. The radar velocity measurement method of claim 11, wherein, in step S4, the phase difference is compared with a comparison model $(f+2\ k\pi)*(t1/(t1+t2))$; f represents the reflection frequency, whose value ranges from 0 to $2\pi$; t1 represents the first transmission time; t2 represents the second transmission time; and k is an integer; when the value of k is adjusted for a value of the comparison model to be equal to the phase difference, the true reflection frequency is $f+2\ k\pi$.

16. The radar velocity measurement method of claim 15, wherein, in step S4, the phase difference is compared with the comparison model through an interpolation method.

17. The radar velocity measurement method of claim 11, wherein a ratio of the first transmission time divided by the transmission cycle ranges from 0.2 to 0.8.

18. The radar velocity measurement method of claim 12, wherein, in step S2, the even number receive sequence is formed of a plurality of first sub-signals and a plurality of first supplementary sub-signals.

19. The radar velocity measurement method of claim 18, wherein, in step S3, after carrying out the time domain to frequency domain conversion upon the even number receive sequence, a supplementary reflection signal is further obtained; a frequency of the supplementary reflection signal is a supplementary reflection frequency which is different from the reflection frequency.

20. A radar device, comprising:
a transmission antenna transmitting an electromagnetic wave signal, the electromagnetic wave signal being orderly formed of a first sub-signal and a second sub-signal; a time of transmitting a single first sub-signal and a single second sub-signal being defined as a transmission cycle, the transmission cycle being orderly formed of a first transmission time of the first sub-signal and a second transmission time of the second sub-signal, and the first transmission time being different from the second transmission time; wherein a ratio of the first transmission time divided by the transmission cycle ranges from 0.2 to 0.8, wherein the radar module comprises a supplementary transmission antenna, which transmits a supplementary electromagnetic wave signal whose transmission cycle is identical to the transmission cycle of the electromagnetic signal; the supplementary electromagnetic signal comprises a first supplementary sub-signal, and the first supplementary sub-signal is transmitted at the first transmission time simultaneously with the first sub-signal, wherein the first supplementary sub-signal has different phases in two neighboring transmission cycles; and
a receive antenna receiving an echo signal of the electromagnetic wave signal reflected by a target object.

* * * * *